M. BELCHER.
CHECK VALVE.
APPLICATION FILED JAN. 17, 1921.

1,399,684.

Patented Dec. 6, 1921.

Mark Belcher, Inventor.

UNITED STATES PATENT OFFICE.

MARK BELCHER, OF GOOSE CREEK, TEXAS.

CHECK-VALVE.

1,399,684.

Specification of Letters Patent.  Patented Dec. 6, 1921.

Application filed January 17, 1921.  Serial No. 437,883.

*To all whom it may concern:*

Be it known that I, MARK BELCHER, a citizen of the United States of America, and resident of Goose Creek, in the county of Harris and State of Texas, have invented certain new and useful Improvements in Check-Valves, of which the following is a specification.

This invention relates to improvements in boiler check valves and has for an object the provision of means whereby the check valve seat may be held removably in place and in such relation to an opening that it is accessible for the purpose of changing valve seats when one becomes worn or otherwise impaired.

It has been found in practice that a device made in accordance with this invention can be repaired expeditiously so that the time required for restoring the valve to normal working conditions makes it unnecessary to reduce the steam pressure in the boiler to which the check valve of this character is applied or to otherwise interrupt the operation included in the generation of steam; the said device being associated with means for interrupting communication between the boiler and the conduit or pipe having the check valve.

A still further object of this invention is to produce a combined globe and check valve casing as a coupling between a feed water pipe and a boiler, the said valves having the characteristics heretofore indicated with respect to the changeability of the valve seat of the check valve, and the globe valve also has the characteristic of embodying a removable valve seat. In check valves now in common use, it is often necessary to regrind the valve seat, or if it is too badly impaired the whole valve must be discarded, while in this device the parts which can wear or deteriorate are replaceable separately or as a whole.

With the foregoing and other objects in view, the invention consists in the details of construction and in the arrangement and combination of parts to be hereinafter more fully set forth and claimed.

In describing the invention in detail, reference will be had to the accompanying drawings forming part of this specification wherein like characters denote corresponding parts in the several views, and in which—

Figure 1:
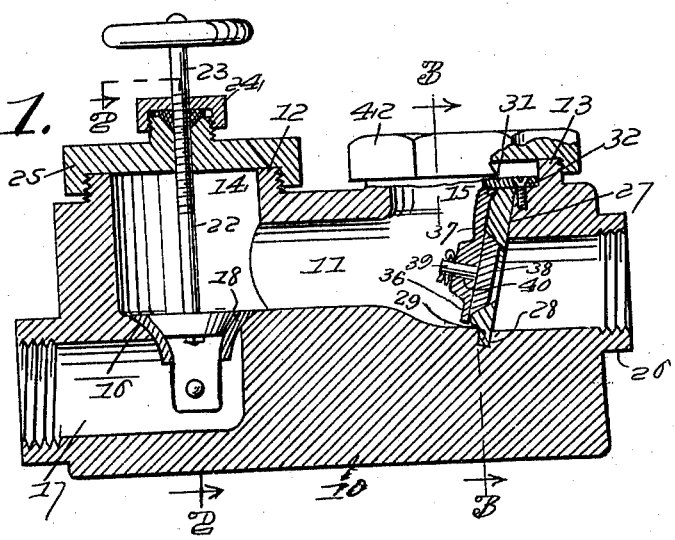
Figure 1 illustrates a sectional view of a combined check and globe valve embodying the invention.
Figure 2:
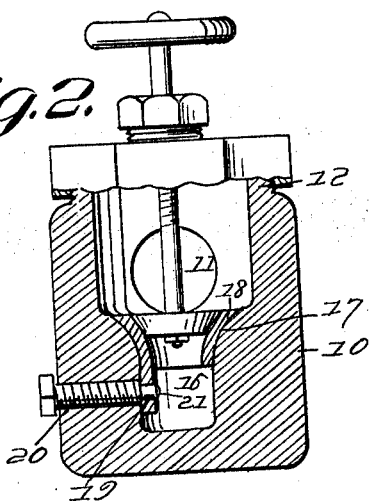
Fig. 2 illustrates a sectional view on the line corresponding with the line 2—2 of Fig. 1.
Figure 3:
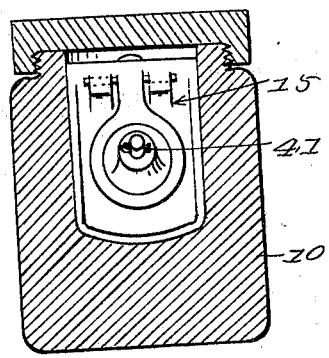
Fig. 3 illustrates a sectional view on the line corresponding with the line 3—3 of Fig. 1.
Figure 4:
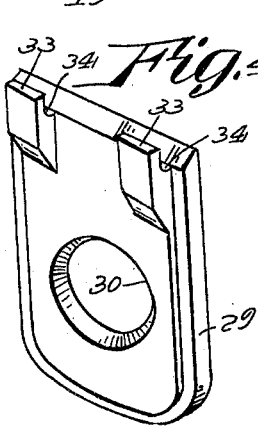
Fig. 4 illustrates a perspective view of the check valve seat.
Figures 5, 6:
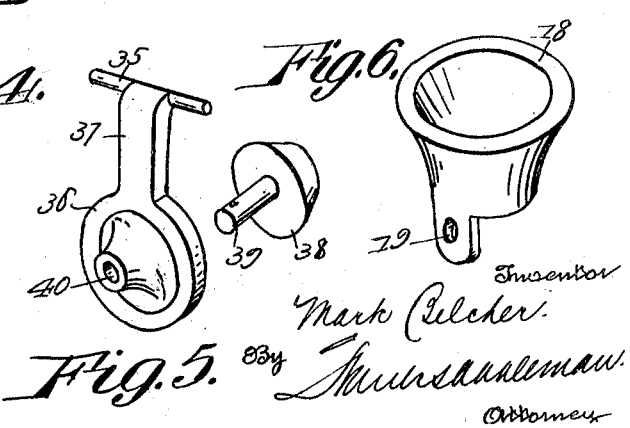
Fig. 5 illustrates a perspective view of the valve, parts of which are disconnected.
Fig. 6 illustrates a perspective view of the seat of the globe valve.

In these drawings 10 denotes the valve casing having a passage 11 therethrough and preferably the annular externally threaded flanges 12 and 13 surrounding openings 14 and 15 respectively in the said casing. The valve casing also has a shoulder 16 at the junction of a coupling nipple 17 and the passage 11 on which shoulder a valve seat 18 is applied, the said valve seat having a depending lug 19 apertured to receive a fastening 20 such as a screw which is threaded through one side of the casing and has a reduced end 21 which enters the said aperture of the lug.

The foregoing arrangement of parts serves to cause the retention of the valve seat 11 so that the valve 22 may operate in conjunction with it; it being shown that the valve 22 has a valve stem 23 rotatably mounted in the packing box 24 of the cap 25 which is threaded on the flange 12.

The end of the casing remote from the nipple 17 has a nipple 26 which is hollow and is a continuation of the channel 11.

There is a shoulder 27 at the junction of the channel 11 and the opening through the nipple and this shoulder is diagonal to the longitudinal axis of the passage through the nipple. The interior of the casing is further provided with a seat or recess 28 in which a flange 29 of the valve seat 30 is inserted in an inclined position as shown in Fig. 1, the said valve seat resting against the shoulder 27 in which position it is secured by a plate 31 held against its edge by a fastening 32 such as a screw which is here shown as threaded in the casing. The upper edge of the valve seat is beveled and therefore it cannot move with relation to the plate when the said plate is secured in place. The valve seat 30 has lugs 33 formed with seats 34 in which the pintle 35 of the check valve carrier 36 may oscillate, it being shown that the pintle and carrier are connected by an arm 37 so that the said carrier may oscillate with relation to the valve seat.

The valve proper in the present embodiment of the invention is identified by the reference numeral 38 and it has an apertured stem 39 which extends through the aperture 40 of the valve carrier, and the said valve is held in the carrier by a pin 41 extending through the aperture of the valve stem. It follows from an inspection of the drawing and from the foregoing description that the valve may open under the pressure of the inflowing fluid and when the parts are in normal operative positions, the globe valve is opened so that there is free communication between the valve casing and the boiler or other receptacle being served, but in case of impairment of the check valve structure the globe valve is closed and access to the interior of the casing may be had through the opening 15 which is here shown as guarded by a screw cap 42 threaded on the annular flange 13. Access so had makes it possible for an operator to remove the valve seat and the parts associated with it, which parts can be restored after inspection or repair.

It is possible by use of a device of this character for an operator to replace the check valve in a feed line without ever having to break the joints between the sections of the line to which the valve is connected.

I claim:

A check valve including a casing having an intake and an outlet opening, a shoulder in the casing diagonally positioned with relation to the longitudinal axis of the intake opening, the said interior of the casing having a recess forming a continuation of the said shoulder, a valve seat lying against the shoulder and having a flange lying in the said recess, a check valve carrier having pintles mounted on the valve seat, a valve removably mounted on the valve carrier, and a plate secured to the casing and bearing against the edge of the valve seat for holding the flange of the said valve seat in the recess of the casing.

MARK BELCHER.